(12) United States Patent
Crolius et al.

(10) Patent No.: US 10,465,675 B2
(45) Date of Patent: Nov. 5, 2019

(54) FLUID VALVE

(71) Applicant: TRANE INTERNATIONAL INC., Piscataway, NJ (US)

(72) Inventors: James Philip Crolius, La Crosse, WI (US); Thomas J. Benedict, La Crosse, WI (US)

(73) Assignee: TRANE INTERNATIONAL INC., Davidson, NC (US)

( * ) Notice: Subject to any disclaimer, the term of this patent is extended or adjusted under 35 U.S.C. 154(b) by 991 days.

(21) Appl. No.: 14/573,035

(22) Filed: Dec. 17, 2014

(65) Prior Publication Data

US 2015/0167660 A1 Jun. 18, 2015

Related U.S. Application Data

(60) Provisional application No. 61/916,921, filed on Dec. 17, 2013.

(51) Int. Cl.
*F04B 49/00* (2006.01)
*F04B 49/22* (2006.01)
(Continued)

(52) U.S. Cl.
CPC ........ *F04B 49/007* (2013.01); *F04B 39/1006* (2013.01); *F04B 49/22* (2013.01);
(Continued)

(58) Field of Classification Search
CPC . F16K 5/06; F16K 5/0605; F16K 5/12; F04B 53/18; F04B 39/02; F04B 39/10;
(Continued)

(56) References Cited

U.S. PATENT DOCUMENTS 2,178,100 A 10/1939 Gygax
3,386,262 A 6/1968 Hackbart et al.
(Continued)

FOREIGN PATENT DOCUMENTS

CN 2103702 U 5/1992
CN 1862154 A 11/2006
(Continued)

OTHER PUBLICATIONS

Flow Through Orifices, Womack Machine SUpply Company, retrieved Nov. 13, 2017 at http://www.womackmachine.com/engineering-toolbox/data-sheets/flow-through-orifices/.*
(Continued)

*Primary Examiner* — Philip E Stimpert
(74) *Attorney, Agent, or Firm* — Hamre, Schumann, Mueller & Larson, P.C.

(57) ABSTRACT

A fluid valve is described to help reduce oil sump pressures of a variable speed compressor and a fixed speed compressor working in parallel in a HVAC system. The fluid valve can be a ball valve. Openings of a variable flow through structure of the ball can be configured to elongate along an equator the ball. When the ball rotates along a rotation axis, a size of a variable fluid path formed between the openings can be varied, resulting in a variable pressure drop across the ball. In operation, when the variable speed compressor is operated at different operation speeds, the ball can be rotated to different positions relative to the rotation axis, which may help reduce the pressure differential between the sumps of the variable speed compressor and the fixed speed compressor.

8 Claims, 7 Drawing Sheets

(51) Int. Cl.
  *F04B 53/10* (2006.01)
  *F16K 5/06* (2006.01)
  *F16K 5/12* (2006.01)
  *F04B 39/10* (2006.01)
(52) U.S. Cl.
  CPC ........ *F04B 53/1002* (2013.01); *F16K 5/0605* (2013.01); *F16K 5/12* (2013.01)
(58) Field of Classification Search
  CPC .... F04B 39/1006; F04B 49/007; F04B 49/22; F04B 53/1002
  USPC .......................................................... 251/209
  See application file for complete search history.

(56) References Cited

U.S. PATENT DOCUMENTS

| | | | |
|---|---|---|---|
| 3,785,169 A | | 1/1974 | Gylland, Jr. |
| 3,883,113 A | * | 5/1975 | Kolb .................... F16K 5/0605 251/151 |
| 4,589,263 A | * | 5/1986 | DiCarlo .................... F25B 5/02 62/193 |
| 4,989,833 A | * | 2/1991 | Polon .................... F16K 5/0605 137/1 |
| 5,150,586 A | | 9/1992 | Basseggio |
| 5,495,963 A | * | 3/1996 | Miller ....................... B05C 5/02 138/43 |
| 5,524,863 A | * | 6/1996 | Davis ....................... B08B 9/00 137/625.32 |
| 5,551,467 A | | 9/1996 | Booth et al. |
| 6,021,812 A | * | 2/2000 | Iwamoto ............... F16K 5/0605 137/625.3 |
| 7,007,503 B2 | | 3/2006 | Takashi |
| 2002/0026806 A1 | * | 3/2002 | Tsuboe ................... F04C 28/08 62/505 |

FOREIGN PATENT DOCUMENTS

| | | |
|---|---|---|
| CN | 101093121 A | 12/2007 |
| CN | 101691945 A | 4/2010 |
| CN | 101988717 A | 3/2011 |
| EP | 0460432 | 12/1991 |
| JP | 2-286972 A | 11/1990 |

OTHER PUBLICATIONS

Chinese Office Action, Chinese Patent Application No. 201410789264.X, dated Dec. 6, 2017, with partial English translation (13 pages).

* cited by examiner

FLUID VALVE

FIELD

The disclosure herein relates to a fluid valve. More particularly, the disclosure herein relates to a fluid valve that can be used to regulate a pressure drop across the fluid valve, when the fluid valve, for example, is used in a suction line of a compressor in a heating, ventilation and air conditioning (HVAC) system.

BACKGROUND

Fluid valves are used in various applications. For example, a fluid valve can be used to cut off or turn on a fluid flow in a refrigerant line in a HVAC system. Some fluid valves, such as a ball valve, may be used to regulate an amount of the fluid (e.g. liquid and/or gas) flowing through the ball valve, or to regulate a pressure drop in the fluid flow flowing through the ball valve.

In a HVAC system, a fluid valve can be used to regulate a pressure drop in the refrigerant and/or lubricant flow.

SUMMARY

Embodiments of a fluid valve (e.g. a ball valve) are described. The fluid valve can be positioned in a suction line of a HVAC system, and can be configured to help reduce a pressure differential between oil sumps of two compressors operating in parallel, such as for example between an oil sump of a variable speed compressor and an oil sump of a fixed speed compressor. This can help equalize oil levels in the oil sumps.

In some embodiments, the HVAC system may include a first compressor with a first oil sump and a second compressor with a second oil sump. The HVAC system may include a ball valve positioned in a suction line to the first oil sump.

In some embodiments, the ball valve may include a flow passage and a ball rotatably disposed in the flow passage. The ball valve may include a variable flow through structure having a first opening and/or a second opening on a surface of the ball. The first opening and the second opening may include a first end and a second end along an equator of the ball. In some embodiments, surface contours connecting the first end and the second end of the first opening and/or the second opening diverge along the equator.

The ball valve of the HVAC system may include a flow passage and the ball may be configured to be rotatable about a rotation axis in the flow passage so that the variable flow through structure of the ball can form a variable fluid path with the flow passage. A pressure drop across the ball valve may be configured to have a variable relationship, such as for example a generally linear relationship, with an amount of rotation of the ball relative to the rotation axis.

In some embodiments, the first end of the first and/or second opening has a shorter arc length than the second end of the first and/or second opening. In some embodiments, the first end of the second opening may be closer to the second end of the first opening than to the first end of the first opening along the equator of the ball. When the ball rotates in a direction that is from the first end to the second end, a size of the variable fluid path can increase.

In some embodiments, when the variable speed first compressor is operated between a minimum operation speed and a maximum operation speed, the amount of the ball rotation required to help reduce the pressure differential between the oil sump of the first compressor and the oil sump of the second compressor may have a variable, e.g. generally linear relationship to the operation speed of the variable speed first compressor. This relationship can be determined, for example, in a laboratory setting.

Other features and aspects of the fluid management approaches will become apparent by consideration of the following detailed description and accompanying drawings.

BRIEF DESCRIPTION OF THE DRAWINGS

Reference is now made to the drawings in which like reference numbers represent corresponding parts throughout.

FIGS. 4A, 4C, 4E, 4G and 4I are side section views. FIGS. 4B, 4D, 4F, 4H and 4J are front views. FIGS. 4A and 4B illustrate the position 1 when the ball valve has a minimal opening. FIGS. 4I and 4J illustrate the position 5 when the ball valve has a maximum opening. FIGS. 4C-4D, FIGS. 4E-4F and FIGS. 4G-4H illustrate positions 2-4 respectively, when the ball valve has openings between the minimal opening and the maximum opening.

DETAILED DESCRIPTION

A fluid valve, such as a ball valve, can be used, for example, in a HVAC system to regulate the pressure drop in a refrigerant and/or lubricant flow. The ball valve can control a size of a fluid path through the valve. Generally, for a given fluid flow, the larger the fluid path available, the less the pressure drop is across the fluid path, and vice versa.

In the embodiments described herein, a fluid valve that can help regulate pressure drop across the fluid valve is described. The embodiments described herein may also be generally used, such as for example, when there is a pressure differential between oil sumps of compressors during operation. The fluid valve can help, for example, reduce a pressure differential between oil sumps of two compressors, such as for example between a variable speed compressor and a fixed speed compressor manifolded in a HVAC system. In some embodiments, the fluid valve can be a ball valve that includes a ball and a flow passage. The ball may include a variable flow through structure having two openings on a surface of the ball. The variable flow through structure can fluidly communicate with the flow passage to define a variable fluid path. The openings of the variable flow through structure may be configured to elongate along a direction defined by an equator of the ball. The openings of the variable flow through structure may have a first end and a second end along the direction defined by the equator of the ball, and the first end can have a relatively shorter arc length than the second end. In some embodiments, the first end and/or the second end can be a half circle shape. When the ball rotates about a rotation axis, the variable flow through structure of the ball and the flow passage can form a variable fluid path, which can result in a variable pressure drop across the ball. In operation, when the variable speed compressor is operated at different operation speeds, the ball can be rotated to different positions relative to the rotation axis so as to, for example, help reduce the pressure differential between the two oil sumps of the compressors in a HVAC with one variable speed compressor and one fixed speed compressor. Generally, the compressor can be a compressor that includes an oil sump, such as a rotary compressor, scroll compressor, screw compressor or a reciprocating compressor.

References are made to the accompanying drawings that form a part hereof, and in which are shown by way of illustration embodiments which may be practiced. It is to be understood that the terms used herein are for the purpose of describing the figures and embodiments and should not be regarded as limited in scope.

Figure 1:
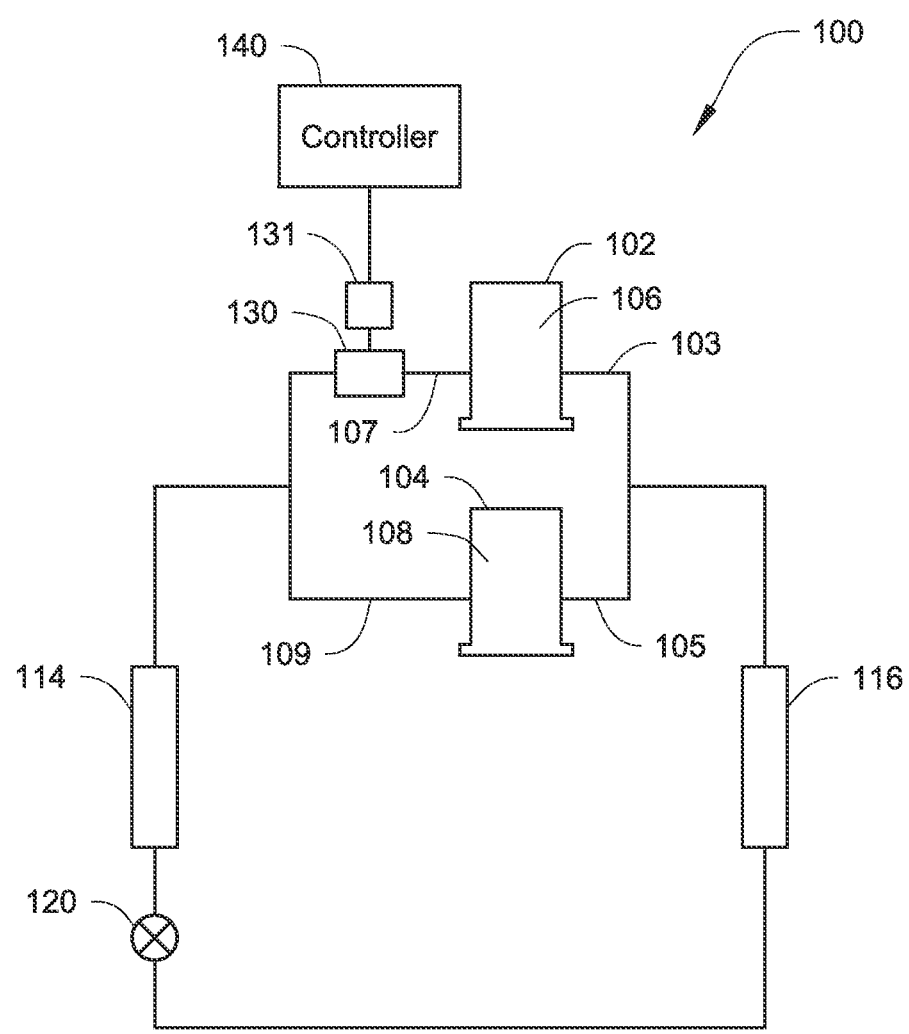
FIG. 1 is a schematic diagram of a HVAC system with two compressors arranged in parallel.

As illustrated in FIG. 1, a HVAC system 100 includes a first compressor 102 and a second compressor 104 manifolded to work in parallel, a first heat exchanger 114 and a second heat exchanger 116, and an expansion device 120 to form a refrigeration circuit.

The first and second compressors 102 and 104 can be the same type of compressor (e.g. scroll compressors or screw compressors) that can operate at different operation speeds. For example, in some embodiments, the first compressor 102 can be a variable speed compressor and the second compressor 104 can be a fixed speed compressor. In operation, the fixed speed second compressor 104 can be configured to operate in a relatively constant operation speed, while the variable speed first compressor 102 can be configured to vary its operation speed depending on, for example, a load of the HVAC system 100. In some embodiments, the first and the second compressors 102 and 104 can be two different types of compressors, such as for example the first compressor 102 can be a scroll compressor and the second compressor 104 can be a screw compressor. In some embodiments, the first and second compressors 102 and 104 can have the same capacity. In some embodiments, the first and second compressors 102 and 104 can have different capacities.

The first and second compressors 102 and 104 include a first oil sump 106 and a second oil sump 108 respectively. The oil sumps 106 and 108 can be configured to store, for example, lubricant such as oil for the compressors 102 and 104 respectively. In operation, the oil is generally pumped out of the oil sumps 106 and 108 into discharge lines 103 and 105 respectively. The lubricant oil can circulate in the refrigerant circuit of the HVAC system 100 and return to the oil sumps 106 and 108 through suction lines 107 and 109 respectively.

The oil sumps 106 and 108 may have an oil equalizer line therebetween (not shown). When a pressure in the oil sump 106 is different from a pressure in the oil sump 106, the pressure differential may drive the oil to move between the oil sumps 106, 108, causing unequal oil levels in the oil sumps 106, 108.

When, for example, the first compressor 102 is a variable speed compressor and the second compressor 104 is a fixed speed compressor, the two compressors 102 and 104 can be operated at different speeds. As a result, the pressures in the oil sumps 106 and 108 respectively may be different, which can cause unequal oil levels in the oil sumps 106 and 108. The amount of pressure differential between the oil sumps 106 and 108 may also vary according to the operation speed of the variable speed compressor. For example, when the operation speed of the variable speed first compressor 102 is reduced, the pressures drop in the suction line 107 may be reduced relative to the suction line 109 of the fixed speed second compressor 104. Consequently, the pressure in the oil sump 106 of the variable speed first compressor 102 may increase relative to the pressure in the oil sump 108 of the fixed speed second compressor 104, causing relatively higher pressure differential between the oil sumps 106 and 108. As a result, the oil level in the oil sump 106 may decrease relative to oil sump 108.

To help reduce the pressure differential between the oil sumps 106 and 108 so that the oil level in the oil sumps 106 and 108 can be relatively equal, and/or in some situations help equalize the pressure differential, a fluid valve 130 can be positioned in the suction line 107 of the first compressor 102 (which can be a variable speed compressor). It can be appreciated that the fluid valve 130 can also be positioned in the suction 109 of the second compressor 104. The fluid valve 130 generally has a variable fluid passage that can be regulated to vary a pressure drop across the fluid valve 130. When the operation speed of one or both of the compressors varies, the fluid valve 130 can be configured to provide a pressure drop that helps reduce the pressure differential between the oil sumps 106 and 108. In some embodiments, the pressure differential between the oil sumps 106 and 108 can be controlled for example to be less than about 2-3 inches of water column (iwc) or 1-2 iwc in some situations, which in some cases can help equalize the oil levels in the oil sumps 106 and 108.

Generally, when two compressors with unequal operation speeds are manifolded such as in a HVAC system (e.g. the HVAC system 100), a pressure drop regulating device, such as the fluid valve 130 or an orifice (not shown), may be employed in the suction line of the compressor with the lower operation speed to help reduce oil sump pressure differential and/or manage oil levels between two oil sumps of the compressors.

The fluid valve 130 can be a ball valve, which generally includes a ball with a variable flow through structure. The ball is disposed in a flow passage of the ball valve. (See FIG. 2 for example.) By rotating the ball of the fluid valve 130 to different positions relative to a rotation axis (see positions 1-5 as illustrated in FIGS. 4A to 4J for example), the pressure drop across the ball can be varied. Generally, the more the fluid valve 130 is open, the less the pressure drop across the fluid valve 130. Therefore, by rotating the fluid valve 130 to different positions, the fluid valve 130 can provide different pressure drops in the suction line 107.

When the variable speed compressor is operated at different speeds causing the pressure differential between the oil sumps 106 and 108 to vary (or when the pressure inside the first oil sump 106 is different from the second oil sump 108), the ball can be rotated to different positions to help reduce the pressure differential between the first oil sump 106 and the second oil sump 108. If, for example, the pressure in the first oil sump 106 is higher than the second oil sump 108, the ball of the fluid valve 130 can be rotated to create a pressure drop in the suction line 107, so that the pressure differential between the first oil sump 106 and the second oil sump 108 can be reduced by the pressure drop created by the fluid valve 130. The term "reduce the pressure differential" generally means to create a pressure drop in the fluid valve 130 that is about the same as the pressure differential between the first oil sump 106 and the second oil sump 108. This can help equalize the oil levels between the first oil sump 106 and the second oil sump 108.

As illustrated in FIG. 1, a controller 140 can be used to control the positions of the fluid valve 130 to regulate the pressure drop across the fluid valve 130. The controller 140, for example, can control an actuator 131 that is configured to rotate a ball of the ball valve 130 to different positions, resulting in different pressure drops across the fluid valve 130.

FIGS. 2, 3 and 4A-4J illustrate schematic diagrams of a ball valve 200 that is generally configured to regulate an amount of fluid flow and/or a pressure drop across the ball valve 200. The ball valve 200 can be used as the fluid valve 130 in FIG. 1, according to one embodiment. The ball valve 200 includes a body 210 and a ball 220 housed inside the body 210.

Figure 2:
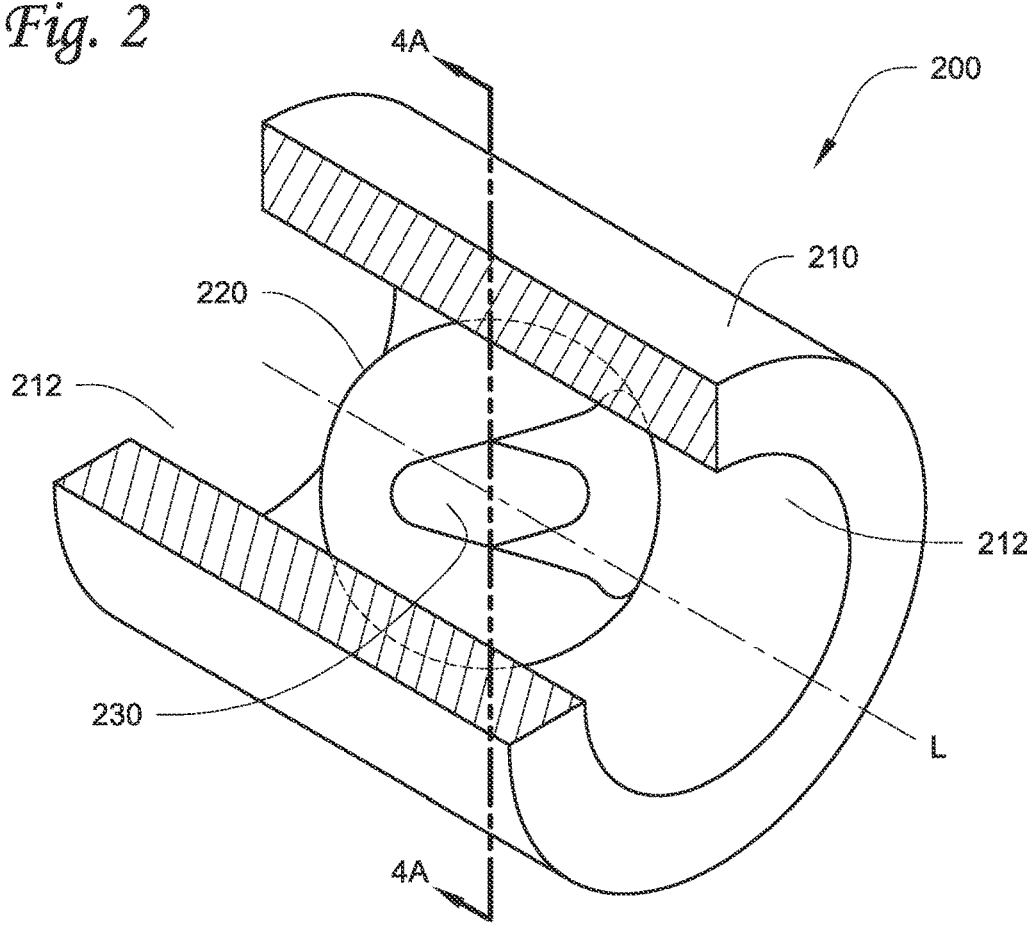
FIG. 2 illustrates a partial cutout view of a ball valve that can be used in a HVAC system according to one embodiment.

As illustrated in the cut-out diagram of FIG. 2, the body 210 includes a fluid passage 212, which may be a suitable connected to a fluid line such as a pipe in a HVAC system, and the ball 220 is disposed in the fluid passage 212. The ball 220 has a variable flow through structure 230 that generally allows fluid to flow through the ball 220. When the ball 220 is rotated, the variable flow through structure 230 can form a variable fluid path 234 (see e.g. positions 1 to 5 as illustrated in FIGS. 4A-4J) that is in fluid communication with the fluid passage 212 in a longitudinal axis L, which can allow a variable amount of fluid to pass therethrough.

Figure 3:
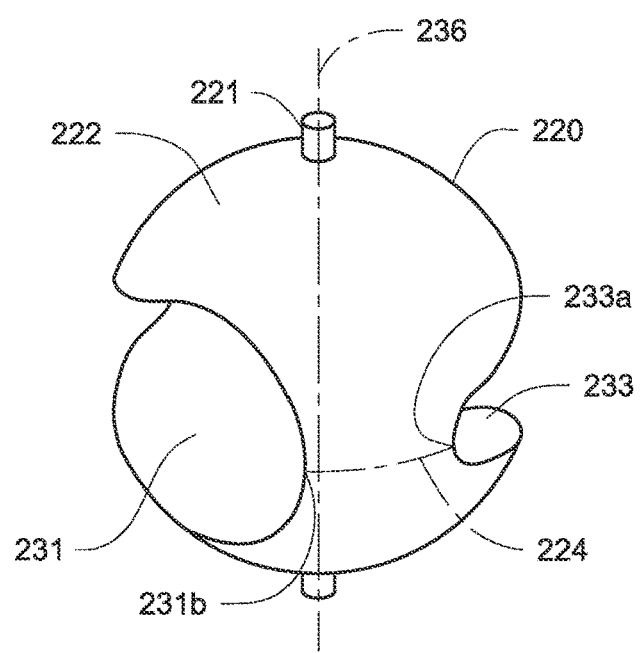
FIG. 3 illustrates a perspective view of a ball that can be used in the ball valve as illustrated in FIG. 2.

FIG. 3 illustrates a perspective view of the ball 220. The ball 220 can have a tab(s) 221 extending along a rotation axis 236, which is generally perpendicular to the longitudinal axis L (as shown in FIG. 2). The tab(s) 221 may help hold the ball 220 in a fluid passage 212 so that the ball 220 can rotate relative to the rotation axis 236 in the fluid passage 212 (as shown in FIG. 2).

The ball 220 has a first opening 231 and a second opening 233. As illustrated in FIG. 3 as well as FIGS. 4B, 4D, 4F, 4H and 4J, the first opening 231 and the second opening 233 extend along an equator 224 of the ball 220 on a surface 222 of the ball 220. FIG. 3 illustrates a first end 233a of the second opening 233 on the surface 222 and a second end 231b of the first opening 231 along the equator 224. More detailed structure of the first and second openings 231 and 233 are described with respect to FIGS. 4A-4J. The equator 224 is generally in a plane that is perpendicular to the rotation axis 236.

FIGS. 4A-4J illustrates front views (FIGS. 4B, 4D, 4F, 4H and 4J) and side section views (FIGS. 4A, 4C, 4E, 4G and 4I) of different positions (positions 1 to 5) of the ball 220 when the ball 220 rotates relative to the rotation axis 236. The side sectional views (e.g. 4A) are generally taken in the direction of line 4A-4A in FIG. 2 with the ball 220 in different positions.

As illustrated in FIGS. 4A-4J, the variable flow through structure 230 passes through the ball 220 internally between the first opening 231 and the second opening 233. From positions 1 to 5, the ball 220 rotates toward the left side of the figure in the orientation as shown by an arrow relative to the rotation axis 236, with the understanding that the ball 220 can also be configured to rotate in an opposite direction.

Generally, when the ball 220 is at different positions (e.g. the positions 1-5), a size of the variable fluid path 234 can vary, resulting in a variable pressure drop across the ball valve 200 when a fluid flows though the ball valve 220. In the front views (FIGS. 4B, 4D, 4F, 4H and 4J), the variable fluid path 234 generally is a fluid passage formed by the fluid communication of the first opening 231 and the second opening 233 within the fluid passage 212 along the longitudinal axis L.

Figure 4A:
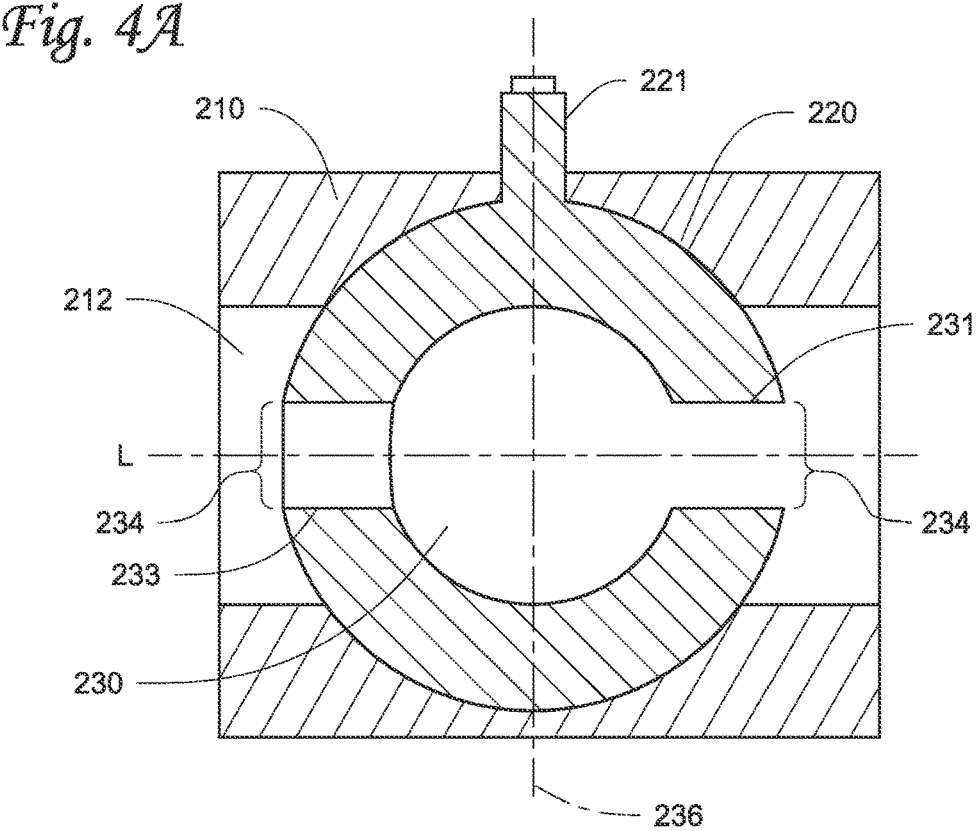
FIGS. 4A to 4J illustrated side section views and front views of the ball valve in FIG. 3 at different positions (positions 1-5) relative to a rotation axis.
Figure 4B:
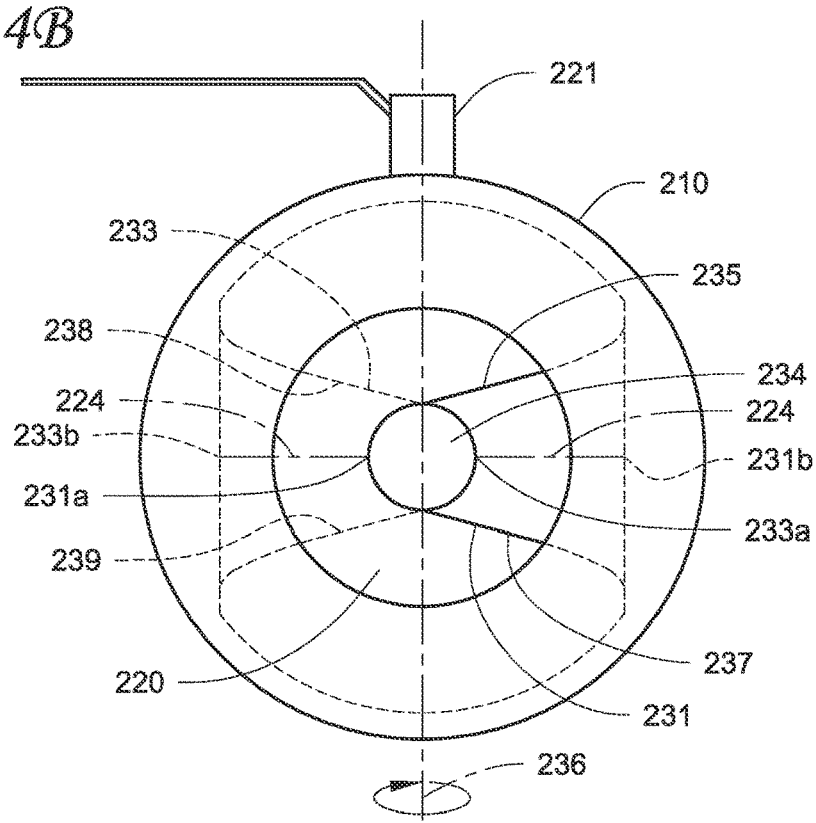
Figure 4C:
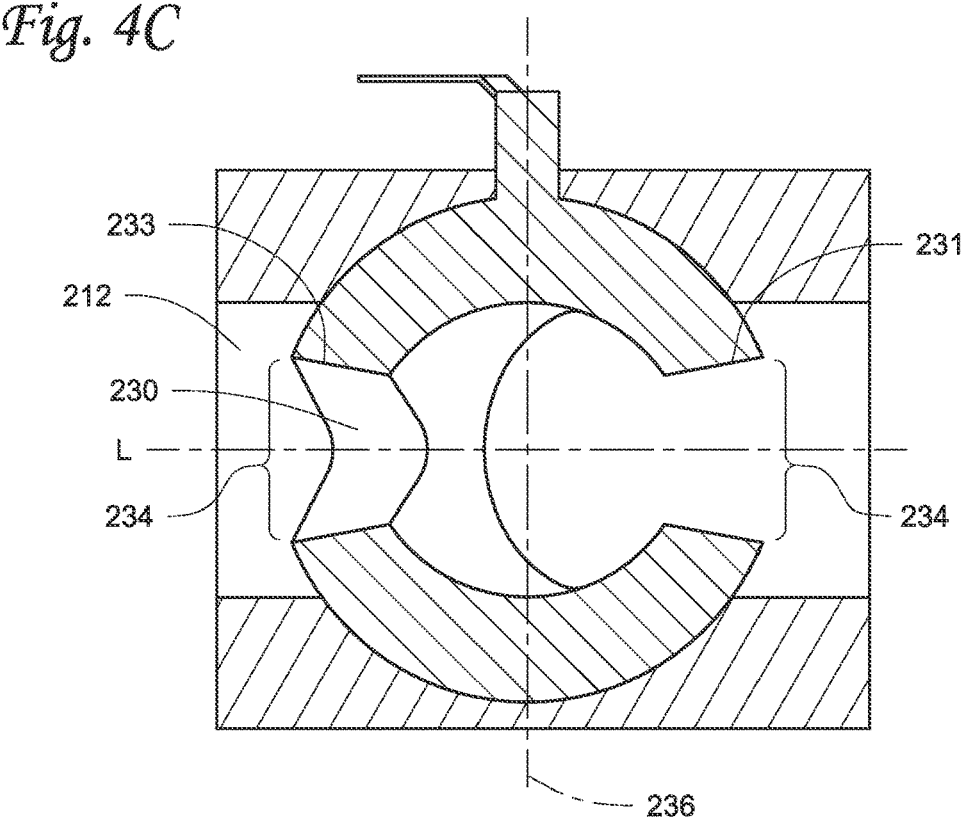

The first and second openings 231 and 233 are on the surface of the ball 220. As shown for example by referring to positions 1 and 5 together (FIGS. 4B and 4J respectively), the first opening 231 has a first end 231a and a second end 231b respectively along the equator 224 of the ball 220 in the direction as shown by the arrow in the orientation as shown in FIGS. 4B and 4J. The equator 224 is generally in a plane that is perpendicular to the rotation axis 236. A shape of the first opening 231 is configured so that surface contours 235 and 237 of the first opening 231 connecting the first end 231a and the second end 231b diverge apart along the equator 224 in the direction as shown by the arrow. An arc length of the first end 231a is generally shorter than an arc length of the second end 231b.

It is to be noted that in some embodiments the second opening 233 has a similar shape as the first opening 231 (such as, for example, as shown in FIGS. 4A-4B and 4I-4J). As shown for example by referring to positions 1 and 5 together (FIGS. 4B and 4J respectively), the second opening 233 has a first end 233a and a second end 233b. In some embodiments, the first opening 231 and the second opening 233 are about rotationally symmetric relative to the rotation axis 236. The term "rotationally symmetric" generally means that the first opening 231 and the second opening 233 are generally symmetric relative to the rotation axis 236. (The portion of the second opening 233 that cannot be seen from the views as shown in FIGS. 4A-4J is generally shown in dashed lines.)

Figure 4D:
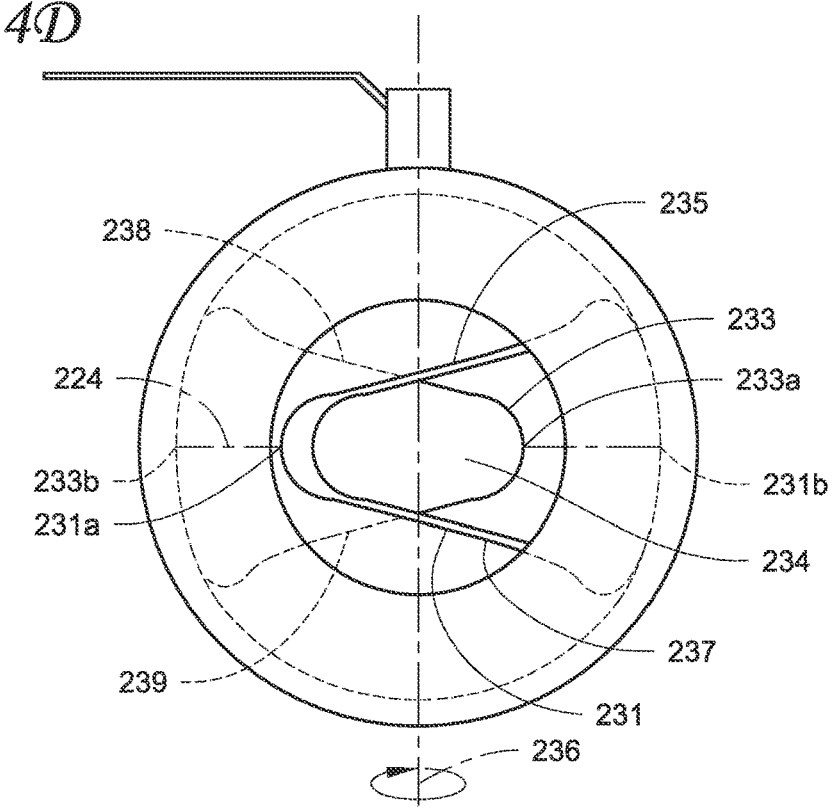
Figure 4E:
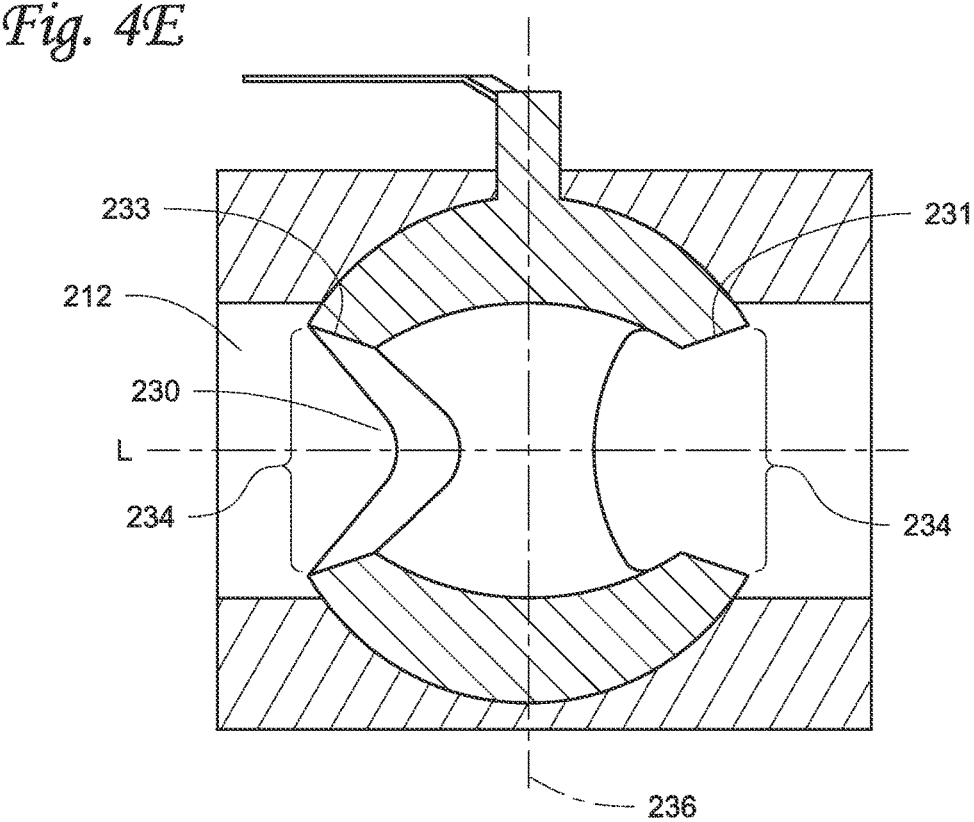
Figure 4F:
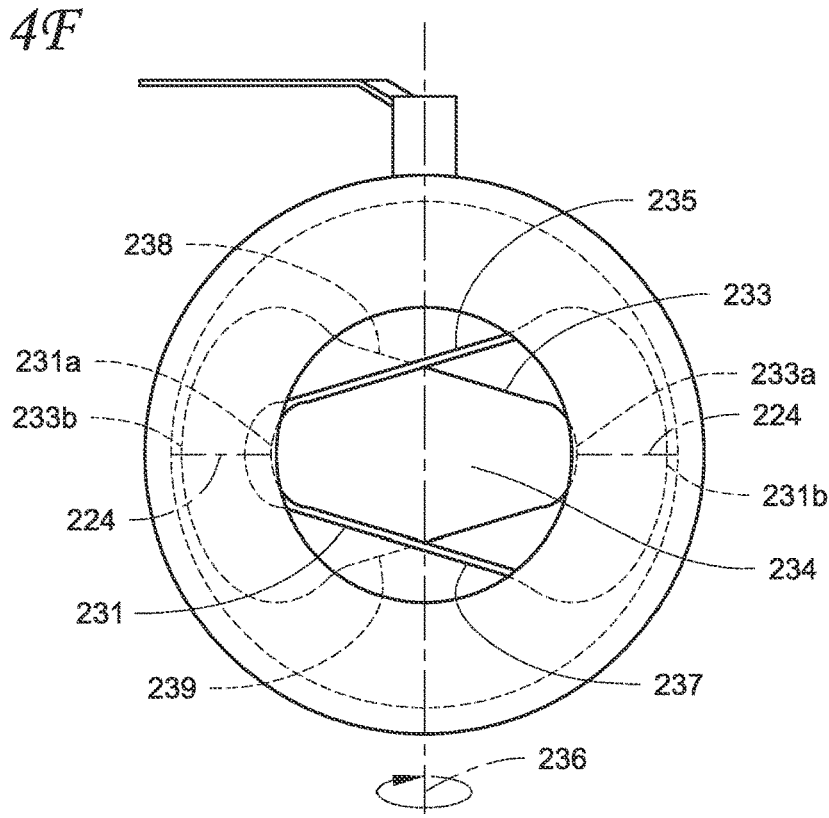

Along the equator 224 of the ball 220, the first end 233a of the second opening 233 is closer to the second end 231b of the first opening 231 than to the first end 231a of the first opening 231, while the second end 233b of the second opening 233 is closer to the first end 231a of the first opening 231 than to the second end 231b of the first opening 231 (see for example FIG. 4D, see also FIG. 3.)

As shown for example at positions 1 and 5 (FIGS. 4B and 4J respectively), the first end 231a and the second end 231b of the first opening 231 may have a half circle shape, with the notion that the first end 231a and/or the second end 231b may have other shapes. As shown for example at position 1, the half circle shaped first end 231a of the first opening 231 can form a relatively small rounded fluid path 234 with the half circle shaped first end 233a of the second opening 233. As shown for example at position 5, the half circle shaped second end 231b of the first opening 231 can form a relatively large rounded fluid path 234 with the half circle shaped second end 233b of the second opening 233. In the illustrated example as shown in FIGS. 4I and 4J, the rounded fluid path 234 formed by the half circled shaped second end 231b of the first opening 231 and the second end 233b of the second opening 233 may have a diameter D5 that is about the same as a diameter D4 of the flow passage 212.

Figure 4G:
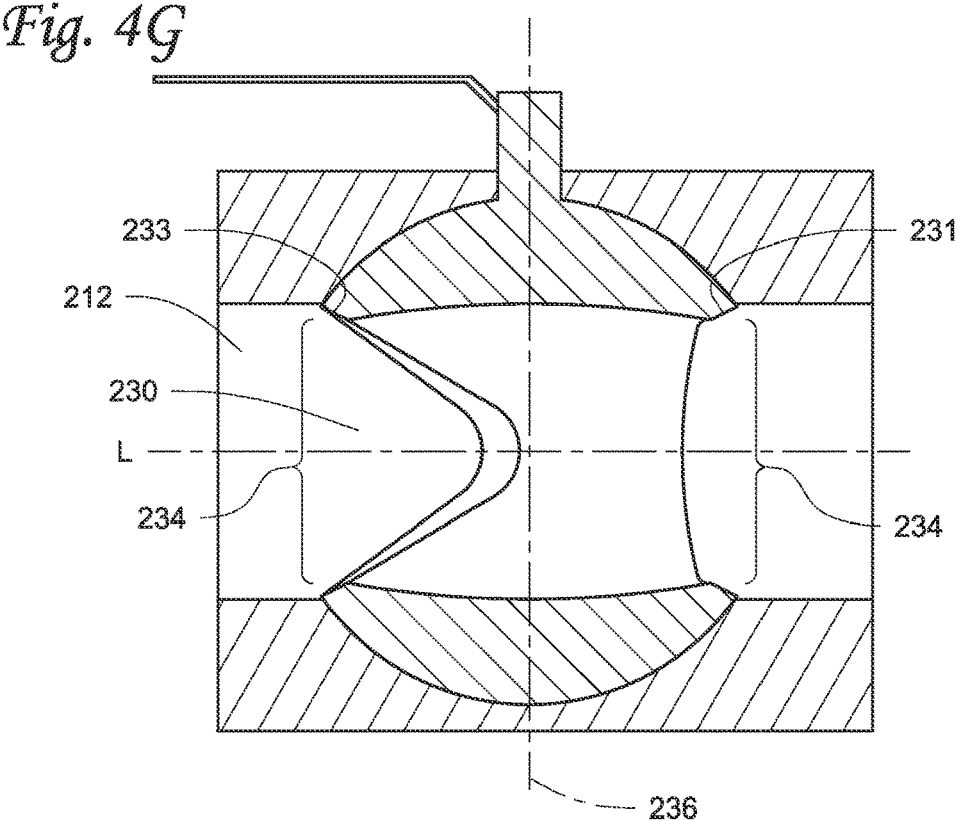
Figure 4H:
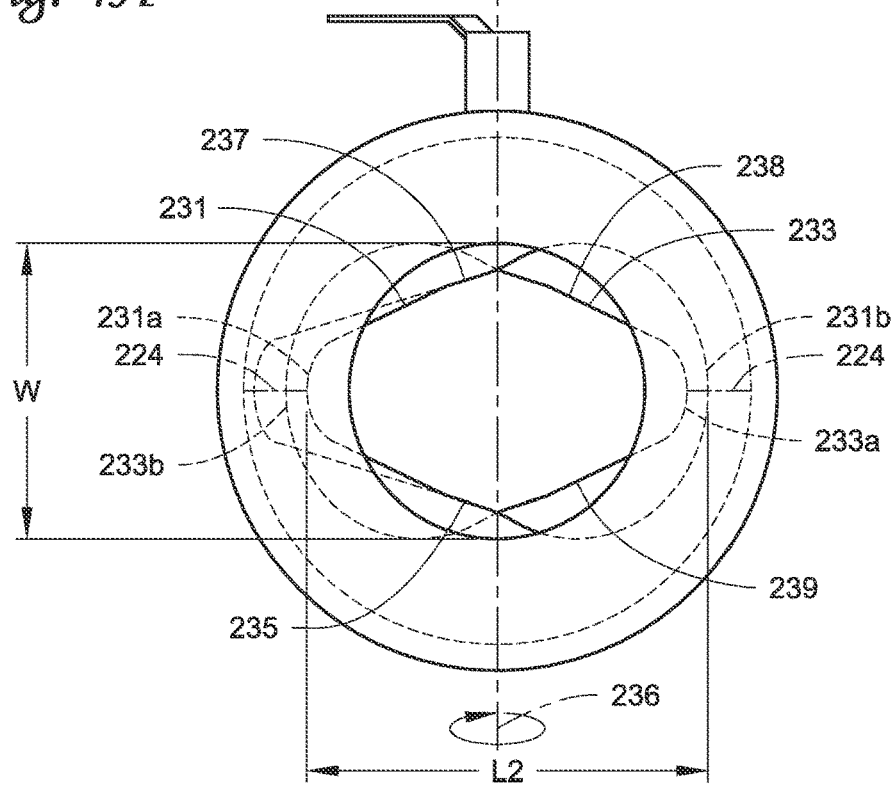
Figure 4I:
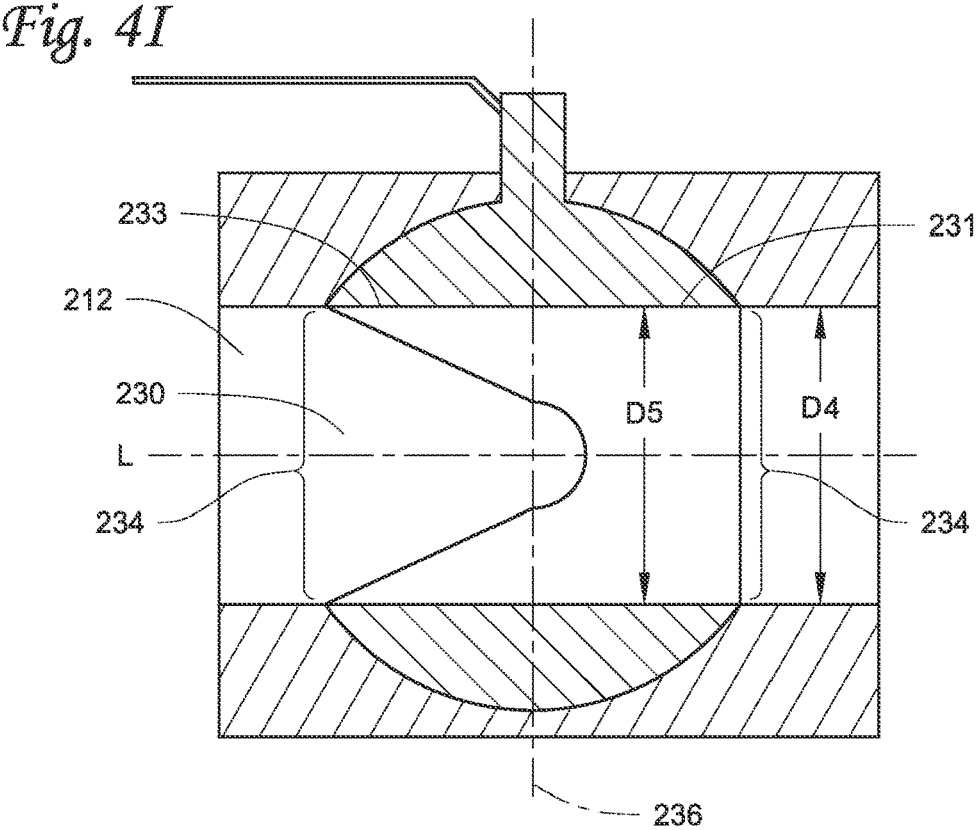
Figure 4J:
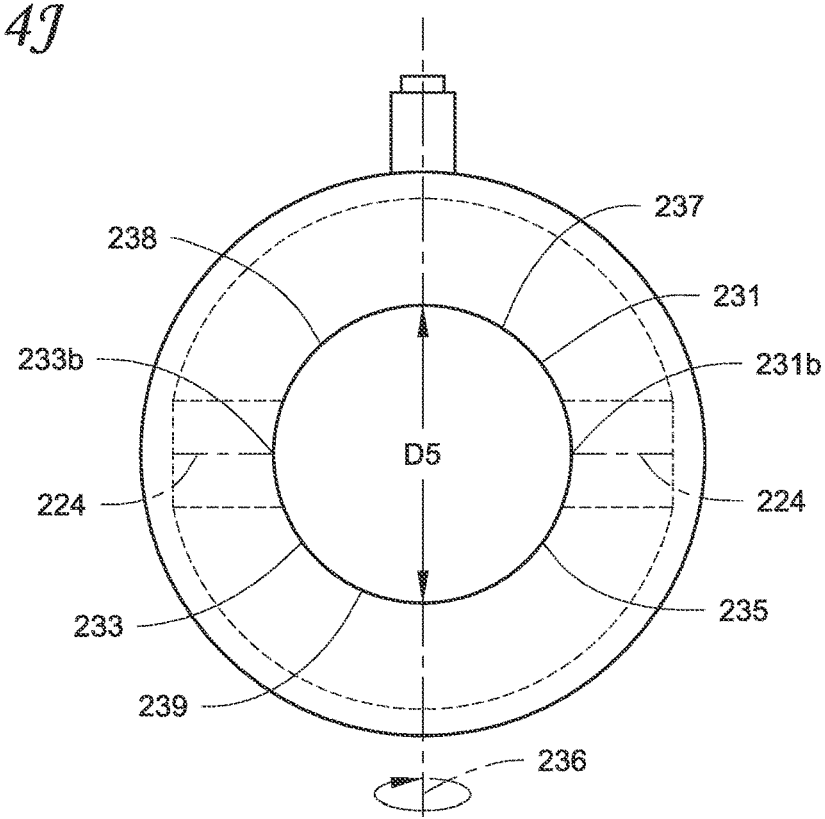

As illustrated in FIGS. 4G-4H at for example position 4, the first opening 231 has a length L2 between the first end 231a and the second end 231b. The length L2 is generally referred to as a length of the longest straight line connecting the first end 231a and the second end 231b of the first opening 231. The first opening 231 also has a width W that is generally referred to as a straight line of the widest portion of the first opening 231 in the direction of the rotation axis 236. Generally, the width W is shorter than the length L2 in the illustrated embodiment, with the notion that in some other embodiments, the length L2 can be shorter than the width W. It is to be noted that the second opening 233 can also be configured to have a similar length L2 and width W.

When the ball 220 rotates in the direction as shown by the arrow, a portion of the first opening 231 and a portion of the second opening 233 can fluidly communicate with the flow passage 212 to form the variable fluid path 234. For example, as illustrated in FIG. 4B, the variable fluid path 234 can be formed generally between the first end 231a of the first opening 231 and the first end 233a of the second opening 233, which can allow fluid to pass through the variable fluid path 234.

As the ball 220 rotates in the direction as shown by the arrow from position 1 to position 5 as illustrated in FIGS. 4A-4J respectively, the diverging surface contours 235 and 237 of the first opening 231 and the corresponding diverging surface contours 238 and 239 of the second opening 233 become further apart. As a result, the variable fluid path 234 continues to enlarge from position 1 to position 5. As the ball 220 rotates to position 5, the variable fluid path 234 is generally formed by the second end 231b of the first opening 231 and the second end 233b of the second opening 233. From positions 1 to 5, the variable fluid path 234 generally increases to allow more fluid to pass through (e.g. corresponding to less pressure drop). At position 5, the variable fluid path 234 is generally at the largest.

Referring to FIGS. 2 and 4A-4J together, generally, the larger the variable fluid path 234 is, the less the pressure drop across the ball valve 200 when fluid passes through the variable fluid path 234 and the flow passage 212. Since the variable fluid path 234 generally increases from positions 1 to 5, the pressure drop across the ball valve 200 generally decreases as the ball 220 rotates from positions 1 to 5 in the direction as shown by the arrow. In the illustrated example as shown in FIGS. 4I and 4J, the rounded fluid path 234 formed by the half circled shaped second end 231b of the first opening 231 and the second end 233b of the second opening 233 may have the diameter D5 that is about the same as the diameter D4 of the flow passage 212 at position 5, which can allow fluid to flow through the fluid passage 212 and the variable flow through structure 230 with a relatively small or no pressure drop.

Referring back to FIG. 1, the ball valve 200 can be used as the fluid valve 130 to regulate the pressure drop across the fluid valve 130 so that the pressure differential between the first sump 106 and the second sump 108 can be reduced, for example, when the first compressor 102 is operated at a speed that is different from the second compressor 104. When the first compressor 102 is not in operation, the ball valve 200 can be closed, and the ball valve 200 can generally prevent fluid from flowing in or out of the first sump 106. When the first compressor 102 is operated at various speeds, different pressure drops across the ball valve 200 (i.e. the fluid valve 130) may be required to help reduce the pressure differential between the first sump 106 and the second sump 108. Generally, the higher the operation speed of the first compressor 102 is, the lower the pressure drop required across the ball valve 200 to reduce the pressure differential between the first sump 106 and the second sump 108. The flow through structure 230 of the ball can be configured (e.g. the shape of the openings 231 and 233) to provide a specific pressure drop profile when the ball 220 rotates relative to the flow passage 212. As a result, a specific pressure drop can be provided by rotating the ball 220 of the ball valve 200 to a specific position relative to the flow passage 202. The specific pressure drop profile can be provided, for example, by computer simulation.

In some embodiments, when the first compressor 102 is operated between a designed minimal operation speed and a designed maximum operation speed, the ball valve 200 can be suitably positioned between, for example, positions 1 and 5 to help reduce the pressure differential between the first sump 106 and the second sump 108 when the operation speed varies. The positions of the ball 220 relative to the rotation axis 236 and thus the pressure drop across the ball 220 can be continuously regulated when the ball rotates between positions 1 and 5. Consequently, a specific operation speed of the first compressor 102 can be suitably matched or corresponded to a specific position of the ball 220 relative to the rotation axis 236 so that the pressure drop provided by the ball valve 200 at the specific position can help reduce the pressure differential between the first sump 106 and the second sump 108 during operation.

In some embodiments, the variable flow through structure 230 can be configured so that the pressure drop profile provided by the ball valve 200 can have a variable relationship, such as for example a generally linear relationship, with the position of the ball 220 relative to the rotation axis 236. For example, from position 1 to position 5, the amount of pressure drop across the variable flow through structure 230 can be configured to decrease in a generally linear fashion corresponding to an amount of rotation of the ball 220 relative to the rotational axis 236 in the direction as shown by the arrow; e.g. same amount of rotation of the ball 220 relative to the rotation axis 236 may result in about the same amount of pressure drop change. In some embodiments, the variable flow through structure 230 can be configured so that when the variable speed first compressor 102 is operated between the designed minimal operation speed and the designed maximum operation speed, certain operation speeds may correspond to a specific position of the ball 220 relative to the rotation axis 236 so that a specific pressure drop can be provided by the ball valve 200 at the specific position. The specific pressure drop provided by the ball 220 may help reduce the pressure differential between the oil sump 106 of the variable speed compressor 102 and the oil sump 108 of the fixed speed second compressor 104. The specific positions of the ball 220 relative to the rotation axis 236 may also have a generally linear relationship with the corresponding operation speeds of the variable speed first compressor 102. In some embodiments, when the variable speed first compressor 102 is operated between the designed minimal operation speed and the designed maximum operation speed, the amount of the ball rotation to reduce the pressure differential between the oil sump 106 of the first compressor 102 and the oil sump 108 of the second compressor 104 may have a generally linear relationship to the operation speed. It is noted that in some embodiments, reducing the pressure differential between the oil sump 106 and the oil sump 108 can mean equalizing the pressure. It is noted that the variable flow structure 230 can be configured so that the pressure drop profile provided by the ball valve 200 can have a variable relationship other than a generally linear relationship. In some embodiments, when the ball 220 rotates between position 1 to position 5, the pressure drop provided by the ball is about 8 iwc to about 1 iwc respectively. This pressure drop range may be sufficient to compensate for the pressure differential between the oil sump 106 of the variable speed first compressor 102 and the oil sump 108 of the fixed speed second compressor 104 during a normal operation.

Referring back to FIG. 1, in operation, the controller 140 of the fluid valve 130 can obtain the operation speed of the first (variable speed) compressor 102, such as for example from a central controller (not shown) of the HVAC system 100. In some embodiments, the operation speed differential between the first compressor 102 (which can be either a variable speed or a fixed speed compressor) and the second compressor 104 (which can be either a variable speed or a fixed speed compressor) may be obtained. Based on, for example, the speed differential between the first compressor 102 and the second compressor 104, the controller 140 can determine the position of the ball 220 that can provide a pressure drop that can help reduce the pressure differential between the first oil sump 106 and the second oil sump 108. The controller 140 can then operate the fluid valve 130 by, for example, setting a ball (such as the ball 220) of the fluid valve 130 at the position by commanding an actuator 131. A correlation between the position of the fluid valve 130 and the operation speed of the first (variable speed) compressor 102 and/or operation speed differential between the first and second compressors 102 and 104 can be established, for example, in a laboratory setting. This correlation can be used by the controller 140 to determine the position of the fluid valve 130 when the operation speed of the first compressor 102 and/or the operation speed differential between the first and second compressors 102 and 104 may vary.

In some embodiments, the controller 140 can, for example, continuously obtain the operation speed of the first compressor 102 and change the position of the ball of the fluid valve 130 to the position corresponding to the operation speed so as to help reduce the pressure differential between the oil sumps 106 and 108 at the specific operation speed.

By using speed differential to control the fluid valve 130 so as to control the pressure differential between the two oil sumps 106 and 108, a device to measure an actual pressure in the sumps 106 and 108 may not be necessary, which may help reduce the cost of the HVAC system 100.

It is to be appreciated that the embodiments as disclosed herein can also work with a configuration that may include two variable speed compressors, and/or with a configuration that may include two compressors with the same capacity or two compressors with different capacities.

The pressure differential between the oil sumps 106 and 108 during operation is generally relatively small, such as about 2-4 iwc, or 1-2 iwc in some other situations. Therefore, the ball 220 generally does not need to withstand a relatively high pressure and can be made of relatively inexpensive materials (e.g. plastic or polymers). By using the ball valve as disclosed herein, the procedure to reduce the pressure differential between the oil sumps 106 and 108 is generally simple, because only an operation speed is needed for setting the position of the ball valve 200. The ball valve 200 is also relatively simple to install to the suction lines of the HVAC system.

Aspects

Any aspects 1 to 7 can be combined with any aspects 8-11. Any aspects 8-10 can be combined with aspect 11.
Aspect 1. A ball valve, comprising:
 a flow passage; and
 a ball disposed in the flow passage, wherein the ball includes a variable flow through structure, the variable flow through structure includes a first opening on a surface of the ball, the first opening includes a first end and a second end along an equator of the ball, surface contours connecting the first end and the second end diverge apart along the equator.
Aspect 2. The ball valve of aspect 1, wherein the variable flow through structure of the ball includes a second opening on the surface of the ball, the second opening includes a first end and a second end along the equator of the ball, surface contours connecting the first end and the second end diverge apart along the equator.
Aspect 3. The ball valve of aspects 1-2, wherein the first end of the first opening has a shorter arc length than the second end of the second opening.
Aspect 4. The ball valve of aspects 2-3, wherein the first end of the second opening has a shorter arc length than the second end of the first opening.
Aspect 5. The ball valve of aspects 2-4, wherein the first end of the second opening is closer to the second end of the first opening than to the first end of the first opening along the equator of the ball.
Aspect 6. The ball valve of aspects 1-5, wherein the first opening has a length and a height, and the length is larger than the height.
Aspect 7. The ball valve of aspects 1-6, wherein the ball is configured to be rotatable along a rotation axis so that the variable flow through structure of the ball can form a variable fluid path with the flow passage, and a pressure drop across the ball valve has a linear relationship with an amount of rotation of the ball along the rotation axis when the variable flow through structure of the ball forms the variable fluid path with the flow passage.
Aspect 8. A HVAC system, comprising:
 a first compressor having a first oil sump;
 a second compressor having a second oil sump; and
 a ball valve positioned in a suction line to the first oil sump, wherein the ball valve includes a flow passage and a ball disposed in the flow passage,
 the ball includes a variable flow through structure,
 the variable flow through structure includes a first opening on a surface of the ball, the first opening includes a first end and a second end along an equator of the ball, surface contours connecting the first end and the second end diverge apart along the equator.
Aspect 9. The HVAC system of aspect 8, wherein the first compressor is a variable speed compressor and the second compressor is a fixed speed compressor.
Aspect 10. The HVAC system of aspects 8-9, wherein the ball is configured to be rotatable along a rotation axis in the flow passage so that the variable flow through structure of the ball can form a variable fluid path with the flow passage, and a pressure drop across the ball valve has a linear relationship with an amount of rotation of the ball along the rotation axis when the variable flow through structure of the ball forms the variable fluid path with the flow passage.
Aspect 11. A method of managing a pressure differential between a first oil sump of a first compressor and a second oil sump of a second compressor in a HVAC system, comprising:
 obtaining an operation speed of the first compressor, wherein the first compressor is a variable speed compressor; and
 operating a fluid valve positioned in a suction line of the first compressor so that a pressure in the first oil sump is about the same as the pressure in the second oil sump, wherein the fluid valve is positioned to provide a pressure drop across the fluid valve depending on a degree of rotation of a ball of the fluid valve.
Aspect 12. The method of aspect 11, wherein the pressure drop across the fluid valve has a linear relationship with the degree of rotation of the ball of the fluid valve.

With regard to the foregoing description, it is to be understood that changes may be made in detail, without departing from the scope of the present invention. It is intended that the specification and depicted embodiments are to be considered exemplary only, with a true scope and spirit of the invention being indicated by the broad meaning of the claims.

What claimed is:
1. A ball valve, comprising:
 a flow passage having a first diameter; and a ball disposed in the flow passage, wherein the ball includes a variable flow through structure, the variable flow through structure includes a first opening and a second opening on a surface of the ball, the first opening includes a first end and a second end along an equator of the ball, surface contours connecting the first end and the second end diverge apart along the equator, the second opening includes a first end and a second end along the equator of the ball, surface contours connecting the first end and the second end diverge apart along the equator, the surface of the ball between the first opening and the second opening along the equator of the ball being closed, the variable flow through structure forms a rounded fluid path having a second diameter along at least a portion of the rounded fluid path that is the same as the first diameter when the ball valve is in a maximum opening position, wherein the first opening has:
 a width corresponding to a line across a widest portion of the first opening in a direction of a rotation axis, and
 a length corresponding to a line across a longest portion of the first opening connecting the first end and the second end of the first opening,
 the width being shorter than the length, and
wherein the first end of the second opening is closer to the second end of the first opening than to the first end of the first opening along the equator of the ball.

2. The ball valve of claim 1, wherein the first end of the first opening has a shorter arc length than the second end of the second opening.

3. The ball valve of claim 1, wherein the first end of the second opening has a shorter arc length than the second end of the first opening.

4. The ball valve of claim 1, wherein the portion being throughout the rounded fluid path.

5. A heating, ventilation, and air conditioning (HVAC) system, comprising:
 a first compressor having a first oil sump;
 a second compressor having a second oil sump, the first and second compressors forming fluid communication when the HVAC system is in operation; and
 a ball valve positioned in a suction line to the first oil sump, wherein the ball valve includes a flow passage and a ball disposed in the flow passage, the flow passage having a first diameter,
 the ball includes a variable flow through structure, the variable flow through structure forms a rounded fluid path having a second diameter along at least a portion of the rounded fluid path that is the same as the first diameter when the ball valve is in a maximum opening position,
 the variable flow through structure includes a first opening and a second opening on a surface of the ball, the first opening includes a first end and a second end along an equator of the ball, surface contours connecting the first end and the second end diverge apart along the equator, the second opening includes a first end and a second end along the equator of the ball, surface contours connecting the first end and the second end diverge apart along the equator, the surface of the ball between the first opening and the second opening along the equator of the ball being closed, wherein the first opening has:
 a width corresponding to a line across a widest portion of the first opening in a direction of a rotation axis, and
 a length corresponding to a line across a longest portion of the first opening connecting the first end and the second end of the first opening,
 the width being shorter than the length, and
wherein the first end of the second opening is closer to the second end of the first opening than to the first end of the first opening along the equator of the ball.

6. The HVAC system of claim 5, wherein the first compressor is a variable speed compressor and the second compressor is a fixed speed compressor.

7. The HVAC system of claim 5, wherein the portion being throughout the rounded fluid path.

8. A method of managing a pressure differential between a first oil sump of a first compressor and a second oil sump of a second compressor in a HVAC system, comprising:
 obtaining an operation speed of the first compressor, wherein the first compressor is a variable speed compressor; and
 operating a fluid valve positioned in a suction line of the first compressor so that a pressure in the first oil sump is about the same as the pressure in the second oil sump, wherein the fluid valve is positioned to provide a pressure drop across the fluid valve depending on a degree of rotation of a ball of the fluid valve, the fluid valve including a flow passage having a first diameter,
 wherein the ball includes a variable flow through structure, the variable flow through structure includes a first opening and a second opening on a surface of the ball, the first opening includes a first end and a second end along an equator of the ball, surface contours connecting the first end and the second end diverge apart along the equator, the second opening includes a first end and a second end along the equator of the ball, surface contours connecting the first end and the second end diverge apart along the equator, the surface of the ball between the first opening and the second opening along the equator of the ball being closed, the variable flow through structure forms a rounded fluid path having a second diameter along at least a portion of the rounded fluid path that is the same as the first diameter when the ball valve is in a maximum opening position, wherein the first opening has:
 a width corresponding to a line across a widest portion of the first opening in a direction of a rotation axis, and
 a length corresponding to a line across a longest portion of the first opening connecting the first end and the second end of the first opening,
 the width being shorter than the length, and
wherein the first end of the second opening is closer to the second end of the first opening than to the first end of the first opening along the equator of the ball.

* * * * *